Patented Jan. 4, 1949

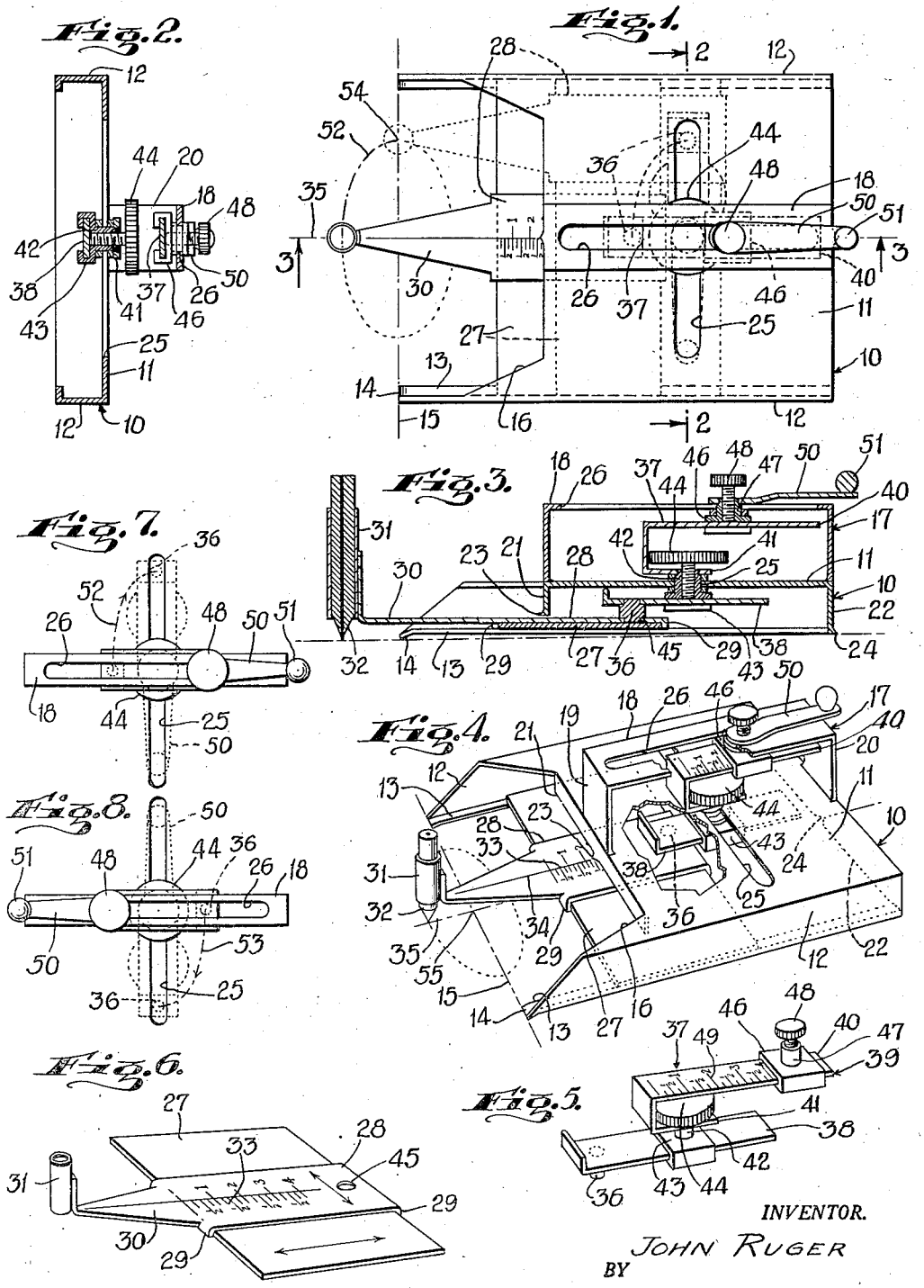

2,458,208

UNITED STATES PATENT OFFICE 2,458,208

SCRIBING INSTRUMENT

John Ruger, Freeport, N. Y.

Application December 2, 1944, Serial No. 566,314

2 Claims. (Cl. 33—31)

This invention relates to what might be generally termed a scriber, but can more generally be defined as an instrument for moving a scribing or other tool through a predetermined and preadjusted path controlled by the instrument. More particularly, the invention deals with instruments of this kind adapted for use in guiding a scriber or other tool through a curved path or from a very narrow ellipse, nearing the straight line to a circular path, the various movements of the scriber or tool being governed to an extent by the size or capacity of the movement of the instrument employed. The novel features of the invention will be best understood from the following description when taken together with the accompanying drawing, in which certain embodiments of the invention are disclosed, and in which the separate parts are designated by suitable reference characters in each of the views; and in which:

Fig. 1 is a plan view of an instrument made according to my invention, showing parts thereof in another position in dotted lines.

Fig. 2 is a section on the line 2—2 of Fig. 1.

Fig. 3 is a section on the line 3—3 of Fig. 1.

Fig. 4 is a perspective view of the instrument as shown in Fig. 1, with parts of the construction broken away and in section.

Fig. 5 is a perspective view of a part of the operating mechanism which I employ detached.

Fig. 6 is a perspective view of other parts of the instrument detached; and

Figs. 7 and 8 are diagrammatic plan views showing the complete cycle of operation of the instrument, showing two positions in full lines and two positions in dotted lines in said figures.

In instruments of the type and kind under consideration, commonly referred to as ellipsographs, difficulty has been experienced by limitations in the operations of the instruments and one of these difficulties has been the inability to scribe the circles or to scribe the materially flattened ellipses approaching what might be termed a straight line.

It is one of the distinctive features of my invention to provide an instrument of the kind under consideration which by reason of the construction employed, enables the instrument to make any type or form of ellipse as well as the circle in any size within the limits of operation of the instrument. It is here to be kept in mind that the instrument may be constructed in different sizes to adapt it for different uses.

Another distinctive feature of the invention resides in the transmission of the motion of the instrument to a scriber widely spaced with respect to the operating mechanism of the instrument to operate within an open or yoke shaped end of the instrument and in utilizing the end extremities of the side walls of the instrument as a gage for arrangement on the worksheet.

In Figs. 1 to 4 inclusive, 10 represents the frame of the instrument. The base of this frame comprises a horizontal wall or platform 11 supported by depending side walls 12 having inturned flanges 13. The flanges 13 at one end of the base are turned downwardly, as seen at 14, note Fig. 3, and form guides for alining the instrument with a line drawn upon a worksheet and indicated by the dot and dash line 15 in Figs. 1 and 4 of the drawing. The wall or platform 11 including side walls 12, are cutout at one end of the instrument to form a large operating opening 16 in which at least part of the scribing is adapted to take place, as will clearly appear from a consideration of Figs. 1 and 4 of the drawing.

The frame 10 also includes centrally and longitudinally thereof a supplemental raised yoke shaped frame 17 comprising a top wall 18 joining the platform 11 in end walls 19 and 20. It will also appear that the wall 11 includes a downwardly extending flange or wall 21 at the inner end of the opening 16 and another wall 22 at what may be termed the rear end of the instrument. The wall 21 has an outwardly extending center pointer 23 and the wall 22 has a corresponding center pointer 24.

The wall or platform 11 has an elongated and transversely extending aperture or channel 25 and the supplemental frame or the top wall 18 thereof has a corresponding longitudinally extending aperture or channel 26 arranged at right angles to and crossing the aperture 25 centrally one with respect to the other. One of the distinctive features of my invention resides in the use of the continuous uninterrupted and unbroken apertures 25 and 26 spaced one above the other, thus providing complete operation of the mechanism for actuating the scriber to the end of forming circles as well as an unlimited range of ellipses.

Resting upon the flanges 13 and movable thereover, longitudinally of the walls 12, is a scriber operating plate 27 shown detached in Fig. 6. On the plate 27 is slidably supported another plate 28 having flanges 29 at the ends thereof engaging the plate 27 to guide the plate 28 in its sliding movement in the direction of the ends of the plate 27, or in other words, in a direction at right angles to the movement imparted to the plate 27 as later described.

The plate 28 has a forwardly extending converging arm 30 in the end of which is a perpendicular cylinder 31 forming a support and holder for any type or kind of scriber 32 or a tool or implement of any kind which is to be guided over a worksheet or workpiece by the instrument. In conventional types of instruments of this kind a pen or pencil can be used. The upper surface of the plate 28 has a scale 33 thereon in conjunction with which the pointer 23 operates to guide the adjustment of both of the plates 27 and 28 in the frame in the setting of the instrument to scribe circles, ellipses or other marks or paths of movement of the member 31 or the scriber or other tools supported therein.

The pointer 23 also registers with a longitudinal center line 34 on the plate 28 in alinement with the axis of the cylinder 31 so that the scriber point can be positioned on another line 35 on the worksheet or workpiece. The other pointer 24 being brought in registration with the line 35 for proper setting of the instrument, the line or mark 35 being at right angles to the line or mark 15.

The plates 27 and 28 may be considered a projector unit for projecting the motion contributed to a primary scribing stud or curved generating member 36 constituting part of the actuating mechanism generally identified by the reference character 37 in Fig. 5 of the drawing. The mechanism 37 comprises a lower straight link or arm 38 and a U-shaped link or arm 39, the link 39 comprising a long upper plate 40 and a short lower plate 41. United with the plate 41 through the medium of a bushing 42 is a slide 43 adapted to operate upon the link 38. In threaded engagement with the bushing 42 is a screw having a large milled head 44 positioned between the plates 40 and 41 and of sufficient diameter to be accessible at the sides of said plates for adjustment. This screw is adapted to bear against the link 38 in adjusting the position of the links 38 and 39 one with respect to the other. The stud 36 is integral with one end of the link 38 and this stud is adapted to operate in an aperture 45 in the plate 28, as clearly seen in Fig. 3.

Adjustable on the link 39 is a slide 46 substantially the same as the slide 43 and includes a bushing portion 47 in which is arranged a milled head screw 48 to clamp the slide 46 in different positions of adjustment on the link 39. This adjustment is guided by the left end portion of the slide, as seen in Fig. 5, set in alinement with the scale markings 49 on the upper surface of the link 39. Secured to the bushing 47 is a crank arm 50 having a knob or finger piece 51 by which said arm may be rotated.

It will appear from a consideration of Figs. 3 and 4 of the drawing that the bushings 42 and 47 operate in the elongated apertures 25 and 26 respectively of the main and supplemental frames 10 and 17. In adjusting the instrument, the screw 44 and the screw 48 will be loosened and the pointer 23 brought into registering alinement with a predetermined marking of the scale 33, after which the screw 44 is tightened. The slide 46 is then brought into registering alinement with the marking on the scale 49 and the screw 48 is tightened. The instrument is now placed with the ends 14 in registering alinement with the line 15 and with the point of the scriber 32 registering with the line 35 while the line 34 is in registration with the pointer 23 and the pointer 24 is also registering with the line 35. In this setting or positioning of the parts, the scriber 31 will assume a predetermined distance outwardly of the line 15 on the line 35. This can represent a starting point and in this position the arm 50 will assume the position shown in full lines in Fig. 1, and also in the position illustrated in Figs. 3 and 4 and the full line position indicated in Fig. 7.

By turning the crank a quarter of a revolution, bringing the same to the dotted line position of Figs. 1 and 7, the scriber will have completed one quarter of an ellipse, as indicated by the dot and dash lines 52 in said figures. The crank is then moved from the dotted line position of Fig. 7 to the full line position of Fig. 8, and the next successive quarter of the ellipse will be formed, bringing the parts to the full line position diagrammatically illustrated in Fig. 8, after which another quarter revolution of the crank 50 will bring the parts to the dotted line position shown in Fig. 8, and will form the third successive quarter of the ellipse designated by the dot and dash lines 53 in Fig. 8, after which the last quarter operation of the instrument will return the crank 50 to the full line position shown in Fig. 7.

In the above described cycle of operation, it will be apparent that the slides 43 and 46 maintaining fixed positions on the links 38 and 39 and the bushings 42 and 47 thereof slide in the apertures 25 and 26. For example, in the first stage of operation, shown in full and dotted lines in Figs. 1 and 7, the axis of the bushing 47 moves to the center of the aperture 26, whereas the bushing 42 moves upwardly in the slot 25 as viewed on the drawing, thus bringing the stud 36 of the link 38 to a position in alinement with the center longitudinal line of the aperture 25, thus bringing the plate 28 to the position shown in dotted lines in Fig. 1 and the plate 27 to the corresponding dotted line position of said figure. Considering the instrument as seen in the drawing, the plate 28 is moved upwardly and at the same time, the plate 27 is moved to the right, thus bringing the center of the scriber at the point of intersection with the line 15, indicated at 54 in Fig. 1 of the drawing.

In the second quarter operation, the plate 27 will be moved further to the right, carrying with it the plate 28 which will then again assume a centralized position with the scriber again registering with the line 35, and in the third quarter position of the parts, the plate 27 will assume the position similar to that shown in dotted lines in Fig. 1, with the plate 28 offset downwardly instead of upwardly, as seen in Fig. 1, with the scriber again registering with the line 15. In the last cycle, the parts will return to the full line position shown in Fig. 1 of the drawing.

From the foregoing, the operation of the actuating mechanism 37 will be clearly understood. At the same time, the varied adjustments of the links one with respect to the other, and gaged by the scales 33 and 49, will provide movement of a scriber defining flat as well as thick ellipses of different sizes within the range of the instrument as well as true circles. In other words, if the distance travelled along the lines 15 and 35 by the scriber are equal with respect to the intersection at 55, note Fig. 4, a circular path will have been travelled by the scriber.

It will be understood that the illustrations in the accompanying drawing are somewhat diagrammatic with respect to the construction and assemblage of the parts. In more elaborate instruments, suitable anti-frictional bearings and the like can be employed as and where needed for smooth and free operation of the parts. However, an instrument of the plain and economical construction illustrated, made from more or less sheet material, can be operated very successfully in producing the desired results. It will also be apparent that the question of spacing the parts can be materially reduced to keep the complete instrument as thin as possible while at the same time providing free movement of the respective parts one over the other and within the main and supplemental frames.

It will appear from the foregoing that no real fixed axis is maintained as both of the axes defined by the screws 44 and 48 are circumferentially shifting in the apertures 25 and 26 and in this motion, the scriber stud 36 travels through the path governed by the predetermined adjustment, for example, the elliptical path illustrated in Figs. 1 and 4 of the drawing. This motion of the stud 36 is transmitted to the projector mechanism basically comprising the plates 27 and 28 in order to perform the scribing by a scriber or other tool at a point remote with respect to the path of travel of the primary scriber stud 36.

Having fully described my invention, what I claim as new and desire to secure by Letters Patent is:

1. An instrument of the class described comprising a frame having spaced upper and lower walls, each wall having an elongated aperture, the aperture of one wall being arranged at right angles to the aperture of the other wall, said apertures crossing each other centrally with respect to the length of said apertures, an actuating mechanism comprising a pair of arms, a bushing having a fixed position on one arm and movable in the aperture of the lower wall and adjustable longitudinally of the second arm, means axially of said bushing for adjustably and fixedly coupling the same with the second arm, a second bushing movable in the aperture of the upper wall and adjustable longitudinally of the first arm, means clamping the second bushing on the first arm, a curve generator member on the second arm spaced with respect to said first bushing and movable in a path determined by relative adjustment of said bushings on said arms, manually rotatable means for operating said mechanism to move said member through a complete predetermined path in each revolution thereof, a projector mechanism comprising relatively sliding plates, one plate being slidably mounted in the frame, the other plate being arranged directly upon and slidably engaging the first plate, said member being directly pivoted to the second named plate, and means on the second named plate in wide spaced relationship to the first named plate for supporting a scribing instrument.

2. In an instrument of the character described, having a rectangular frame, a plate mounted to slide longitudinally of the frame, another plate slidably engaging the first plate, said last named plate having means supporting a scribing instrument thereon, said plates comprising projector means of the instrument, a mechanism for actuating said projector means, said mechanism comprising a pair of arms, one arm having a curve generating member coupled with the second named plate, means comprising a bushing with a clamp screw axially of the bushing for adjustably clamping said arm with the other of said arms, another clamp bushing adjustably clamped to the last named arm, means in the frame arranged in crossed relationship to each other and engaging the bushings of said arms for guiding said mechanism in the frame, and manually actuated means fixed to the last named bushing for actuating said mechanism.

JOHN RUGER.

REFERENCES CITED

The following references are of record in the file of this patent:

UNITED STATES PATENTS

| Number | Name | Date |
|---|---|---|
| 16,175 | Campbell | Dec. 9, 1856 |
| 830,784 | Hanes et al. | Sept. 11, 1906 |
| 1,029,515 | Schreiber | June 11, 1912 |
| 1,168,081 | Kirk et al. | Jan. 11, 1916 |

FOREIGN PATENTS

| Number | Country | Date |
|---|---|---|
| 35,151 | Australia | Nov. 10, 1908 |
| 78,015 | Germany | Nov. 20, 1894 |